United States Patent
Modeki et al.

(10) Patent No.: US 9,466,829 B2
(45) Date of Patent: Oct. 11, 2016

(54) LITHIUM—MANGANESE-TYPE SOLID SOLUTION POSITIVE ELECTRODE MATERIAL

(71) Applicant: Mitsui Mining & Smelting Co., Ltd., Tokyo (JP)

(72) Inventors: Akihiro Modeki, Ageo (JP); Yanko Marinov Todorov, Ageo (JP); Shinya Kagei, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 351 days.

(21) Appl. No.: 13/966,788

(22) Filed: Aug. 14, 2013

(65) Prior Publication Data

US 2013/0327979 A1 Dec. 12, 2013

Related U.S. Application Data

(63) Continuation of application No. PCT/JP2012/053275, filed on Feb. 13, 2012.

(30) Foreign Application Priority Data

Feb. 18, 2011 (JP) ................. 2011-033071
Jun. 29, 2011 (JP) ................. 2011-143917

(51) Int. Cl.
*H01M 4/36* (2006.01)
*H01M 4/505* (2010.01)
*H01M 4/525* (2010.01)
*H01M 10/052* (2010.01)

(52) U.S. Cl.
CPC ............ *H01M 4/364* (2013.01); *H01M 4/505* (2013.01); *H01M 4/525* (2013.01); *H01M 10/052* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2004/0234857 A1 | 11/2004 | Shiozaki et al. | |
| 2007/0122703 A1 | 5/2007 | Whitfield et al. | |
| 2007/0218359 A1 | 9/2007 | Shimizu et al. | |
| 2009/0127520 A1 | 5/2009 | Whitfield et al. | |
| 2009/0280412 A1* | 11/2009 | Imanari | C01G 45/1228 429/221 |
| 2010/0233550 A1 | 9/2010 | Yanagida et al. | |

FOREIGN PATENT DOCUMENTS

| | | | |
|---|---|---|---|
| JP | 2007503102 A | 2/2007 | |
| JP | 2007242581 A | 9/2007 | |
| JP | 2008270201 A | 11/2008 | |
| JP | 2010108873 A | 5/2010 | |
| JP | 2010277790 A | 12/2010 | |
| JP | 2010282874 A | 12/2010 | |
| JP | 201134943 A | 2/2011 | |
| JP | 2011029000 | * | 2/2011 |
| WO | 03044881 A1 | 5/2003 | |

OTHER PUBLICATIONS

Wu et al. Structural stability of chemically delithiated layered (1-z)Li[Li1/3Mn2/3]O2-zLi[Mn0.5-yNi0.5-yCo2y]O2 solid solution cathodes. Journal of Power Sources 183 (2008) 749-754.*
Johnson et al. The significance of the Li2MnO3 component in 'composite' xLi2MnO3 (1-x)LiMn0.5Ni0.5O2 electrodes. Electrochemistry Communications 6 (2004) 1085-1091.*
Amalraj et al. Synthesis of Integrated Cathode Materials xLi2MnO3 (1-x)LiMn1/3Ni1/3Co1/3O2 (x=0.3,0.5,0.7) and Studies of Their Electrochemical Behavior. Journal of the Electrochemical Society 157 (10) A1121-A1130 (2010).*
Ito et al., "The electrochemical properties of Li2MnO3—LiMO2 system for lithium-ion batteries," Denki-Kagaku-Kai Summary of Speech, Mar. 29, 2010, vol. 77, 1B22.
Ito et al., "A new approach to improve the high-voltage cyclic performance of Li-rich layered cathode material by electrochemical pre-treatment," Journal of Power Sources, 2008, pp. 344-346, vol. 183.
Kim et al., "Electrochemical and Structural Properties of xLi2M'O3*(1-x)LiMn0.5Ni0.5O2 Electrodes for Lithium Batteries (M'=Ti, Mn, Zr; 0<=x<=0.3)," Chem. Mater, 2004, pp. 1996-2006, vol. 16, No. 10.
Zhang et al., "Synthesis and electrochemistry of layered 0.6LiNi0.5Mn0.5O2*xLi2MnO3*yLiCoO2 (x+y=0.4) cathode materials," Materials Letters, 2004, pp. 3197-3200, vol. 58.

* cited by examiner

*Primary Examiner* — Tanisha Diggs
(74) *Attorney, Agent, or Firm* — The Webb Law Firm

(57) ABSTRACT

Provided is a lithium-manganese-type solid solution positive electrode material capable of effectively suppressing gas generation in an initial cycle. Proposed is a lithium-manganese-type solid solution positive electrode material that includes a monoclinic structure of C2/m in a hexagonal structure of a space group R-3m. The lithium-manganese-type solid solution positive electrode material contains a solid solution expressed by a composition formula: $xLi_{4/3}Mn_{2/3}O_2 + (1-x)LiMn_\alpha Co_\beta Ni_\gamma O_2$ (in the formula, $0.2 \leq \alpha \leq 0.6$, $0 \leq \beta \leq 0.4$, and $0.2 \leq \gamma \leq 0.6$). In the composition formula, x is equal to or more than 0.36 and less than 0.50.

6 Claims, 2 Drawing Sheets

LITHIUM—MANGANESE-TYPE SOLID SOLUTION POSITIVE ELECTRODE MATERIAL

CROSS REFERENCE TO RELATED APPLICATIONS

This application is a continuation of International Application No. PCT/JP2012/053275, filed Feb. 13, 2012, and claims priority to Japanese Patent Application Nos. 2011-033071 filed Feb. 18, 2011, and 2011-143917 filed Jun. 29, 2011, the disclosures of which are hereby incorporated in their entirety by reference.

FIELD OF THE INVENTION

The present invention relates to a solid solution positive electrode material that may be used as a positive electrode active material of a lithium battery such as a lithium primary battery, a lithium secondary battery, a lithium ion secondary battery, and a lithium polymer battery, and particularly, to a lithium-manganese-type solid solution positive electrode material containing lithium and manganese.

DESCRIPTION OF RELATED ART

In a lithium battery, particularly, a lithium secondary battery, a mass per unit quantity of electricity is small, and thus the energy density thereof is high. Accordingly, the lithium secondary battery has been spreading quickly as a driving power supply that is mounted on portable electronic apparatuses such as a video camera, a notebook computer, and a cellular phone, or on electric vehicles.

A high energy density of the lithium secondary battery is mainly dependent of a potential of a positive electrode material, and as a positive electrode active material, in addition to lithium manganese oxide ($LiMn_2O_4$) having a spinel structure, lithium composite oxides (LiMxOy) such as $LiCoO_2$, $LiNiO_2$, and $LiMnO_2$ which have a layer structure have been known.

The positive electrode active material used in the majority of lithium secondary batteries that currently come into the markets is $LiCoO_2$ having a high voltage of 4 V. Since Co is significantly expensive, as a substitution material of $LiCoO_2$, for example, $LiFePO_4$, $LiNi_{1/3}Mn_{1/3}Co_{1/3}O_2$, and the like may be included, and research on the substitution materials is in progress.

In recent years, it has been reported that a solid solution of $LiMO_2$ and $Li_2MnO_3$ used as the positive electrode active material exhibits a high capacity nearly double the capacity of $LiCoO_2$ in a case of being charged up to 4.5 V or more (Non-Patent Document 1), and that so-called solid solution positive electrode material has attracted attention.

With regard to the solid solution positive electrode material, for example, Patent Document 1 discloses a positive electrode material for a lithium ion battery which is expressed by a general formula: $xLiMO_2 \cdot (1-x)Li_2NO_3$ (here, x represents a number satisfying $0<x<1$; M represents one or more transition metals of which an average oxidation state is $3^+$; and N represents one or more transition metals of which an average oxidation state is $4^+$), and is subjected to an oxidation treatment.

In addition, Patent Document 2 discloses a positive electrode for a lithium ion battery, wherein a main active material of the positive electrode is expressed by a general formula: $xLi_2MO_3 \cdot (1-x)Li[Ni_{1-y-z}Co_yA_z]O_2$ (here, x represents a number satisfying $0.4<x<1.0$; M represents one or more elements selected from a group consisting of Mn, Ti, and Zr; A represents one or more elements selected from a group consisting of B, Al, Ga, and In; $0<y\le0.3$; and $0<z\le0.1$).

CITATION LIST

Non-Patent Document

Non-Patent Document 1: A. Ito, D. Li, Y. Ohsawa, Y. Sato, J Power Sources, 183, 344 (2008)
Patent Document
Patent Document 1: JP 2008-270201 A
Patent Document 2: JP 2010-108873 A Among the above-described solid solution positive electrode materials, the lithium-manganese-type solid solution positive electrode material has been regarded as a promising material from the viewpoints that a discharge potential is high, a high energy density may be expected, and the raw material cost may be reduced because Mn is used as a base. However, this kind of lithium-manganese-type solid solution positive electrode material has a serious problem in that a gas is generated when being charged and discharged, particularly, in an initial cycle.

Therefore, the invention provides a new lithium-manganese-type solid solution positive electrode material capable of effectively suppressing gas generation in an initial cycle.

SUMMARY OF THE INVENTION

The present inventors suggest a lithium-manganese-type solid solution positive electrode material that includes a monoclinic structure of C2/m in a hexagonal structure of a space group R-3m. The lithium-manganese-type solid solution positive electrode material contains a solid solution expressed by a composition formula: $xLi_{4/3}Mn_{2/3}O_2+(1-x)LiMn_\alpha Co_\beta Ni_\gamma O_2$ (in the formula, $0.2\le\alpha\le0.6$, $0\le\beta\le0.4$, and $0.2\le\gamma\le0.6$). In the composition formula, x is equal to or more than 0.36 and less than 0.50.

In the solid solution of $Li_{4/3}Mn_{2/3}O_2$ and $LiMn_\alpha Co_\beta Ni_\gamma O_2$ (in the formula, $0.2\le\alpha\le0.6$, $0\le\beta\le0.4$, and $0.2\le\gamma\le0.6$), when the solid solution is produced by significantly narrowing the x, representing a molar ratio between $Li_{4/3}Mn_{2/3}O_2$ and $LiMn_\alpha Co_\beta Ni_\gamma O_2$, to be equal to or more than 0.36 and less than 0.50, it is proved that gas generation in an initial cycle is significantly suppressed. Accordingly, the solid solution positive electrode material may be used for a large-sized battery that was not realized when use common type of solid solution positive electrode material.

BEST MODE(S) FOR CARRYING OUT THE INVENTION

Next, the invention will be described based on embodiments, but the invention is not limited to the embodiments to be described below.

<Composition of Present Solid Solution Positive Electrode Material>

A solid solution positive electrode material according to the embodiment (hereinafter, referred to as "present solid solution positive electrode material") is a positive electrode material which includes a monoclinic structure of C2/m in a hexagonal structure of a space group R-3m, and which contains a solid solution expressed by a composition formula: $xLi_{4/3}Mn_{2/3}O_2+(1-x)LiMn_\alpha Co_\beta Ni_\gamma O_2$ (in the formula, $0.2 \leq \alpha \leq 0.6$, $0 \leq \beta \leq 0.4$, and $0.2 \leq \gamma \leq 0.6$).

Figure 1:
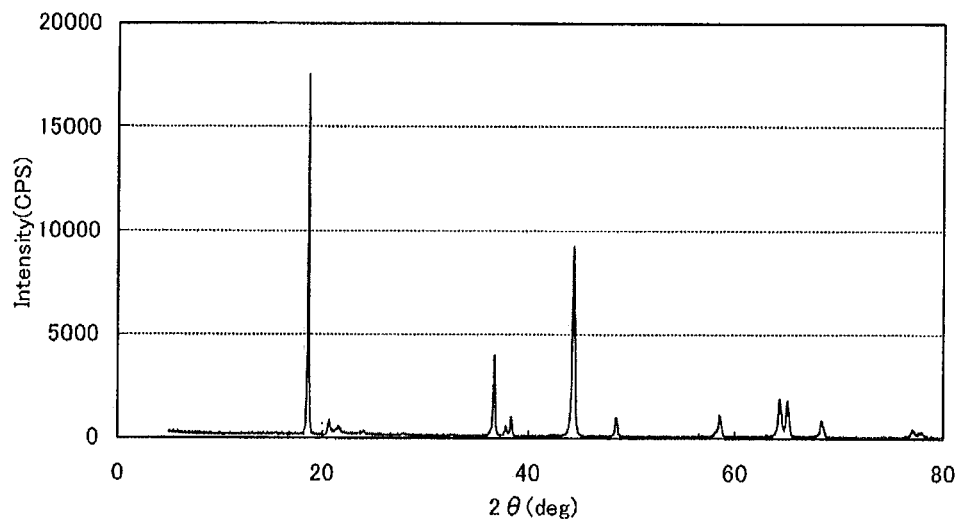
FIG. 1 is an XRD pattern of a solid solution powder (sample) which is obtained in Example 2.

As can be seen also from an XRD pattern illustrated in FIG. 1, the present solid solution positive electrode material has a peak which does not belong to the hexagonal structure of the space group R-3m, but belongs to the monoclinic structure of C2/m at $2\theta=19.5$ to $23.0°$ in addition to a peak that belongs to the hexagonal structure of the space group R-3m. This represents that the present solid solution positive electrode material has the monoclinic structure of C2/m in the hexagonal structure of the space group R-3m.

In the present solid solution positive electrode material, it is important that x, representing a molar ratio between $Li_{4/3}Mn_{2/3}O_2$ and $LiMn_\alpha Co_\beta Ni_\gamma O_2$ (in the formula, $0.2 \leq \alpha \leq 0.6$, $0 \leq \beta \leq 0.4$, and $0.2 \leq \gamma \leq 0.6$), is equal to or more than 0.36 and less than 0.50. When x is equal to or more than 0.36 and less than 0.50, gas generation in an initial cycle may be significantly suppressed. From the viewpoint of capable of suppressing the gas generation, x is more preferably 0.38 to 0.48, and still more preferably 0.40 to 0.47.

In addition, as the above-described $LiMn_\alpha Co_\beta Ni_\gamma O_2$ (in the formula, $0.2 \leq \alpha \leq 0.6$, $0 \leq \beta \leq 0.4$, and $0.2 \leq \gamma \leq 0.6$), a composition formula expressed by $LiMn_{(1-\beta)/2}Co_\beta Ni_{(1-\beta)/2}O_2$ is more preferable. At this time, when β that specifies a molar ratio of Mn, Co, and Ni is 0.2 or less, gas generation may be effectively suppressed. In addition, β may be 0.0, and β may be within a range of 0.0 to 0.2.

In addition, in the composition formula, as a substitution element of the metal elements other than Li, that is, Mn, Co, and Ni, one kind or two kinds selected from a group consisting of Nb, V, Mg, Al, and Ti may be contained. However, the total content of the substitution element is preferably 10% by mole or less of the number of moles of the metal elements other than Li. When the total substitution elements content is 10% by mole or less, it is considered that the same effect as a case in which the substitution elements are not contained may be obtained.

Furthermore, the present solid solution positive electrode material may further contain B (boron). At this time, B (boron) may be present in the solid solution, or may be present outside the solid solution.

From the viewpoint of effectively suppressing the gas generation, in the present solid solution positive electrode material, a c-axis length of a crystal lattice in the hexagonal structure of the space group R-3m is preferably 14.255 Å to 14.275 Å, more preferably 14.257 Å to 14.274 Å, and still more preferably 14.259 Å to 14.271 Å.

In addition, similarly, from the viewpoint of effectively suppressing the gas generation, in the present solid solution positive electrode material, it is preferable that in an XRD pattern that is obtained by XRD measurement, a ratio of the sum area of peaks located within a range of $\theta=19.5°$ to $23.5°$ to the total area obtained by adding the sum area of peaks located within the range of $\theta=18.0°$ to $19.5°$ and the sum area of peaks located within a range of $\theta=43.0°$ to $46.0°$ is 0.145 to 0.185, more preferably 0.148 to 0.182, and still more preferably 0.151 to 0.179.

The peaks located within the range of $\theta=18.0°$ to $19.5°$ correspond to diffraction peaks derived from a (003) plane of a space group R-3m and peaks derived from a (001) plane of a space group C2/m. The peaks located within the range of $\theta=43.0°$ to $46.0°$ correspond to diffraction peaks derived from a (104) plane of the space group R-3m, and peaks derived from a (022) plane, a (220) plane, a (–202) plane, and a (131) plane of the space group C2/m. The peaks located within the range of $\theta=19.5°$ to $23.5°$ correspond to diffraction peaks derived from a (020) plane and a (110) plane of the space group C2/m. Accordingly, the peak area ratio correlates with the amount of the crystal structure of the space group C2/m with respect to the entirety of crystal structures including the space groups R-3m and C2/m, and thus the content of the crystal structure of the space group C2/m with respect to the entirety of the crystal structures may be examined by examining the peak area ratio.

<Method of Producing Present Solid Solution Positive Electrode Material>

First, for example, raw materials such as a lithium salt compound, a manganese salt compound, a nickel salt compound, and a cobalt salt compound are mixed with each other, and the resultant mixture is pulverized by a wet-type pulverizer or the like. Then, the resultant pulverized mixture is granulated and dried by a spray drier or the like, and is burned. The resultant burned material is classified, or milled using a classifier-attached collision-type mill if necessary. In addition, a heat treatment and a subsequent classification are performed depending on the circumstance, whereby the present solid solution positive electrode material may be obtained.

However, the method of producing the present solid solution positive electrode material is not limited to the above-described production method. For example, a granulated powder, which is subjected to the burning, may be prepared by using the generally called coprecipitation method.

Examples of the lithium salt compound include lithium hydroxide (LiOH), lithium carbonate ($Li_2CO_3$), lithium nitrate ($LiNO_3$), lithium hydroxide hydrate ($LiOH·H_2O$), lithium oxide ($Li_2O$), fatty acid lithium, lithium halide, and the like. Among these, the lithium hydroxide, the lithium carbonate, and the lithium nitrate are preferable.

The manganese salt compound is not particularly limited. For example, manganese carbonate, manganese nitrate, manganese chloride, manganese dioxide, and the like may be used. Among these, manganese carbonate and manganese dioxide are preferable. In the manganese salt compounds, electrolytic manganese dioxide that may be obtained according to an electrolytic method is particularly preferable.

The kind of the nickel salt compound is not particularly limited. For example, nickel carbonate, nickel nitrate, nickel chloride, nickel oxyhydroxyde, nickel hydroxide, nickel oxide, and the like may be used. Among these, nickel carbonate, nickel hydroxide, and nickel oxide are preferable.

The kind of the cobalt salt compound is not particularly limited. For example, basic cobalt carbonate, cobalt nitrate, cobalt chloride, cobalt oxyhydroxide, cobalt hydroxide, cobalt oxide, and the like may be used. Among these, the basic cobalt carbonate, the cobalt hydroxide, the cobalt oxide, and the cobalt oxyhydroxide are preferable.

When mixing the raw materials, it is preferable to add a liquid medium such as water and a dispersant to the raw materials to perform wet-type mixing for slurrying of the raw materials. In addition, the obtained slurry is preferably to be milled using a wet-type mill. However, a dry milling can be also used.

In addition, it is preferable that average particle size (D50) becomes from 0.2 μm to 1.0 μm after milling.

A granulation method may be a wet-type method or a dry-type method as long as various raw materials that are milled in the precedent process are not separated and are dispersed in a granulated particle. Examples of the granulation method include an extruding granulation method, a rolling granulation method, a fluidized bed granulation method, a mixing granulation method, a spray drying granulation method, a pressure molding granulation method, and a flake granulation method using a roll or the like. However, in the case of the wet-type granulation, it is necessary to sufficiently dry the raw materials before burning. Examples of a dry method include dry methods in the related art such as a spray thermal dry method, a hot-air dry method, a vacuum dry method, and a freeze-dry method. Among these, the spray thermal dry method is preferable. The spray thermal dry method is preferably performed using a spray drier.

The burning is preferably performed in a burning furnace under an air atmosphere, an atmosphere in which an oxygen partial pressure is adjusted, a carbon dioxide gas atmosphere, or other atmospheres in such a manner that retention is performed for 0.5 hours to 30 hours at a temperature of 850° C. to 1,100° C. (representing a temperature in a case of bringing a thermocouple into contact with a burned product in a burning furnace). At this time, it is preferable to select burning conditions in which a transition metal is solid-soluted in an atom level and shows a single phase.

The kind of the burning furnace is not particularly limited. For example, the burning may be performed using a rotary kiln, a still-standing furnace, or other burning furnaces.

Classification after the burning has a technical meaning of adjusting a particle size distribution of an agglomerated powder and of removing foreign matters. In addition, it is preferable to perform the classification to obtain an average particle size (D50) from 2 µm to 50 µm.

It is preferable that the milling after the classification is performed to realize fine milling using a classifier-attached collision-type mill, for example, a classification-rotor-attached counter jet mill in such a manner that a ratio between the average particle size (D50) and a crystallite diameter is within a predetermined range.

Powder particles, obtained by milling using the classifier-attached collision-type mill commonly have a not-spherical shape.

In the heat treatment, it is preferable that retention is performed under an air atmosphere for 0.5 hours to 20 hours under an environment of 300° C. to 700°, and more preferably 600° C. to 700° C. At this time, at a temperature lower than 300° C., there is a concern that it is difficult to obtain the heat treatment effect, and thus the fine powder remains not sintered. On the other hand, when the heat treatment is performed at a temperature higher than 700° C., sintering starts, and thus powder characteristics of the invention may not be obtained.

The classification after the heat treatment has a technical meaning of adjusting a particle size distribution of an agglomerated powder and of removing foreign matters. In addition, it is preferable to perform the classification in an average particle size (D50) of 2 µm to 50 µm.

<Usage of Present Solid Solution Positive Electrode Material>

The present solid solution positive electrode material may be effectively used as a positive electrode active material of lithium batteries after being crushed and classified as necessary.

For example, the present solid solution positive electrode material, a conducting material comprised of carbon black and the like, and a binder comprised of Teflon (registered trademark) binder and the like are mixed with each other to prepare a positive electrode mixture. In addition, a lithium battery may be constructed by using the positive electrode mixture that is obtained as described above, lithium or a material such as carbon capable of intercalating and deintercalating lithium as a negative electrode, and a material, which is obtained by dissolving a lithium salt such as lithium hexafluorophosphate ($LiPF_6$) in a mixed solvent such as ethylene carbonate and dimethyl carbonate, as a non-aqueous electrolyte.

The lithium battery that is constituted as described may be used for a driving power supply that is mounted on electronic apparatuses such as a notebook computer, a cellular phone, a cordless phone extension, a video movie, a liquid crystal television, an electric shaver, a portable radio, a headphone stereo, a backup power supply, and a memory card, medical equipment such as a pacemaker and a hearing aid, and electric vehicles. Among these, the lithium battery is particularly useful as a driving power supply of various kinds of portable computers such as a cellular phone, a PDA (Personal Digital Assistant), and a notebook computer, an electric vehicle (including a hybrid vehicle), a power storage power supply, and the like in which excellent cycle characteristics are demanded.

<Explanation of Phrase>

In the present specification, description of "X to Y" (X and Y are arbitrary numbers) includes a meaning of "equal to or more than X and equal to or less than Y" and meaning of "preferably larger than X" or "preferably smaller than Y" unless otherwise stated.

In addition, description of "X or more" (X is an arbitrary number) or "Y or less" (Y is an arbitrary number" also includes intension of "preferably larger than X" or "preferably smaller than Y".

EXAMPLES

Next, the invention will be further described with reference to examples and comparative examples that are practically produced, but the invention is not limited to the following examples.

<Battery Evaluation>

A laminate-type battery was prepared using a solid solution powder (sample) produced in examples and comparative examples as a positive electrode active material. The following gas generation evaluation test and battery performance evaluation test were performed using the battery.

(Preparation of Laminate-Type Battery)

90% by weight of the solid solution powder (sample) produced in examples and comparative examples as a positive electrode active material, 5% by weight of acetylene black as a conducting agent, 5% by weight of PVDF (polyvinylidene fluoride) as a binding agent were mixed with each other, and NMP (N-methyl pyrrolidone) was added to the resultant mixture to prepare a paste. The paste was applied on an aluminum foil current collector having a thickness of 15 µm, and was dried at 100° C. Then, the resultant positive electrode current collector on which the paste was applied was compressed to have a thickness of 80 µm to prepare a positive electrode sheet.

Copper foil having a thickness of 18 µm was used as a negative electrode current collector. 92% by weight of graphite as an active material and 8% by weight of PVDF as a binding agent were mixed with each other, and NMP was added to the resultant mixture to prepare paste. The paste was uniformly applied on the negative electrode current collector, and was dried at 100° C. Then, the resultant negative electrode current collector on which the paste was applied was compressed to have a thickness of 80 μm to prepare a negative electrode sheet.

The positive electrode sheet that was obtained as described above was cut to a size of 2.9 cm×4.0 cm, and was used as a positive electrode. In addition, the negative electrode sheet that was obtained as described above was cut to a size of 3.1 cm×4.2 cm, and was used as a negative electrode. A separator (formed from porous polyethylene film) was interposed between the positive electrode and the negative electrode to prepare a laminate-type battery. A separator to which an electrolyte was impregnated was used as the separator. The electrolyte was obtained by dissolving LiPF6 in a mixed solvent of ethylene carbonate, ethyl methyl carbonate, and dimethyl carbonate (volume ratio=20: 20:60) to have a concentration of 1 mol/liter, and by further adding 2% by volume of vinylene carbonate as an additive to the resultant solution.

(Gas Generation Evaluation Test)

The laminate-type battery that was prepared by the above-described method was left as is for 12 hours, and the laminate-type battery was charged with a current density of 0.2 CmA/cm² until a potential difference between both electrodes became 4.8 V. Then, the laminated-type battery was discharged with 0.2 CmA/cm² until the potential difference became 1.9 V. Next, with the same current value, a cycle of charging until the potential difference between both electrodes became 4.5 V and discharging until the potential difference became 1.9 V was performed 99 times.

An amount (mL) of swelling generated up to this time was measured by an immersion volumetric method (solvent substitution method based on Archimedes' principle).

Each results of Table 1 represent the total amount obtained by performing measurement to two laminate-type batteries.

(Battery Performance Evaluation Test)

The following charging and discharging was performed using the laminate-type battery prepared as described above to obtain a capacity retention ratio of each cycle compared to initial capacity.

A charging and discharging voltage range was set to 1.9 V to 4.8 V in the first cycle, and 1.9 to 4.5 V from the second cycle. In consideration of the content of the positive electrode active material in the positive electrode, a current value was obtained and was set in order for a charging and discharging rate to be 0.2 C. The charging and discharging was repeated under these conditions to calculate the capacity retention rate in each cycle with respect to an initial discharge capacity. A measurement temperature was set to 25° C.

<XRD Measurement>

The XRD measurement was performed under the following conditions using an XRD measurement device (device name: RINT-TTR III, manufactured by Rigaku Corporation) to obtain an XRD pattern, and a peak area was obtained based on the XRD pattern.

A "peak area ratio" in table was calculated as a ratio of the sum area (the former/the latter) of peaks located within a range of θ=19.5° to 23.5° to the total area obtained by adding the sum area of peaks located within the range of θ=18.0° to 19.5° and the sum area of peaks located within a range of θ=43.0° to 46.0° by analyzing the obtained XRD pattern. In addition, background removal was not performed during the calculation.

=XRD Measurement Condition=

X-ray source: CuKα, operation axis: 2θ/θ, measurement method: continuous, and counting unit: cps Initiation angle: 5°, and termination angle: 80°

Sampling width: 0.02°, and scanning speed: 4°/min

Voltage: 50 kV, and current: 300 mA

Divergence slit; ⅔°, and divergence vertical limit slit: 10 mm

Scattering slit: ⅔°, and light-receiving slit: 0.15 mm

With regard to measurement of the c-axis length, refinement of a lattice constant was performed using analysis software "JADE version 7.5.22 (Japanese version)" to obtain the c-axis length.

Example 1

Lithium carbonate having an average particle size (D50) of 8 μm, electrolytic manganese dioxide having an average particle size (D50) of 22 μm, cobalt oxyhydroxide having an average particle size (D50) of 14 μm, and nickel hydroxide having an average particle size (D50) of 25 μm were weighed in such a manner that a molar ratio of Li:Mn:Co:Ni becomes 1.143:0.572:0:0.285, and were mixed and stirred with water added thereto, whereby slurry having a solid content concentration of 50% by weight was prepared.

Ammonium polycarboxylate (SN dispersant 5468, manufactured by SAN NOPCO LIMITED) as a dispersant was added to the obtained slurry (raw material powder: 20 kg) in a content of 6% by weight based on the slurry solid content, and the resultant mixture was milled using a wet-type mill at 1,300 rpm for 29 minutes to set the average particle size (D50) to 0.7 μm.

The obtained milled slurry was granulated and dried using a spray drier (OC-16, manufactured by OHKAWARA KAKOHKI CO., LTD.). Granulation and drying were performed using a rotary disk for spraying, the disk rotation was adjusted to 21,000 rpm, a slurry supply amount to 24 kg/hr, and an exit temperature of a dry column was adjusted to 100° C.

The obtained granulated powder was burned using a static type electric furnace in the air at 950° C. for 20 hours. The burned powder that was obtained after the burning was classified using a sieve having an opening of 75 μm to obtain a lithium-manganese-type solid solution powder (sample).

Examples 2 to 7, and Comparative Examples 1 and 2

A lithium-manganese-type solid solution powder (sample) was prepared in the same manner as Example 1 except that the composition of the raw material was changed.

<XRD Measurement and ICP Emission Spectrometry>

The lithium-manganese-type solid solution powders (samples) that were obtained in Examples 1 to 7, and Comparative Example 1 and 2 were analyzed by XRD measurement. In the XRD measurement, for example, as illustrated in FIG. 1, peaks that were not derived from R-3m and belonged to C2/m were recognized at 2θ=19.5° to 23.0°. Accordingly, it was confirmed that the lithium-manganese-type solid solutions that were obtained in Examples 1 to 7 and Comparative Examples 1 and 2 include C2/m monoclinic structure in a hexagonal structure of a space group R-3m, and the solid solution is a solid solution of $Li_{4/3}Mn_{2/3}O_2$ and $LiMn_{1/2}Ni_{1/2}O_2$.

In addition, the composition analysis of the lithium-manganese-type solid solution powders (samples) that were obtained in Examples 1 to 7 and Comparative Examples 1 and 2 was performed by ICP emission spectroscopy, and compositions in Table 1 were found.

TABLE 1

| | Amount of gas generation of two laminate cells after 100 cycles [cc] | Metal molar ratio calculated from ICP analysis results (Me is fixed to 2) | | | | $xLi_{4/3}Mn_{2/2}O_2 + (1-x)LiMn_\alpha Co_\beta Ni_\gamma O_2$ | | | | Capacity retention rate of laminate cell after 100 cycles [%] | Lattice constant c-axis [Å] | Peak area ratio [—] |
|---|---|---|---|---|---|---|---|---|---|---|---|---|
| | | Li | Mn | Co | Ni | $\alpha$ | $\beta$ | $\gamma$ | $x$ | | | |
| Example 1 | Less than measurement limit | 1.130 | 0.588 | 0.000 | 0.278 | 0.5 | 0.0 | 0.5 | 0.43 | 77.9 | 14.271 | 0.167 |
| Example 2 | Less than measurement limit | 1.140 | 0.593 | 0.000 | 0.270 | 0.5 | 0.0 | 0.5 | 0.45 | 76.5 | 14.269 | 0.162 |
| Example 3 | Less than measurement limit | 1.140 | 0.591 | 0.000 | 0.261 | 0.5 | 0.0 | 0.5 | 0.47 | 77.1 | 14.266 | 0.170 |
| Example 4 | Less than measurement limit | 1.150 | 0.535 | 0.000 | 0.318 | 0.5 | 0.0 | 0.5 | 0.36 | 78.2 | 14.274 | 0.156 |
| Example 5 | 1.0 | 1.190 | 0.561 | 0.000 | 0.247 | 0.5 | 0.0 | 0.5 | 0.49 | 85.8 | 14.256 | 0.185 |
| Example 6 | Less than measurement limit | 1.190 | 0.536 | 0.030 | 0.245 | 0.455 | 0.09 | 0.455 | 0.45 | 73.2 | 14.264 | 0.146 |
| Example 7 | 1.0 | 1.160 | 0.526 | 0.060 | 0.252 | 0.41 | 0.18 | 0.41 | 0.45 | 79.5 | 14.258 | 0.163 |
| Comparative Example 1 | 1.5 | 1.090 | 0.573 | 0.000 | 0.337 | 0.5 | 0.0 | 0.5 | 0.30 | 71.1 | 14.280 | 0.140 |
| Comparative Example 2 | 2.5 | 1.190 | 0.603 | 0.000 | 0.205 | 0.5 | 0.0 | 0.5 | 0.60 | 83.3 | 14.252 | 0.189 |

Figure 2:
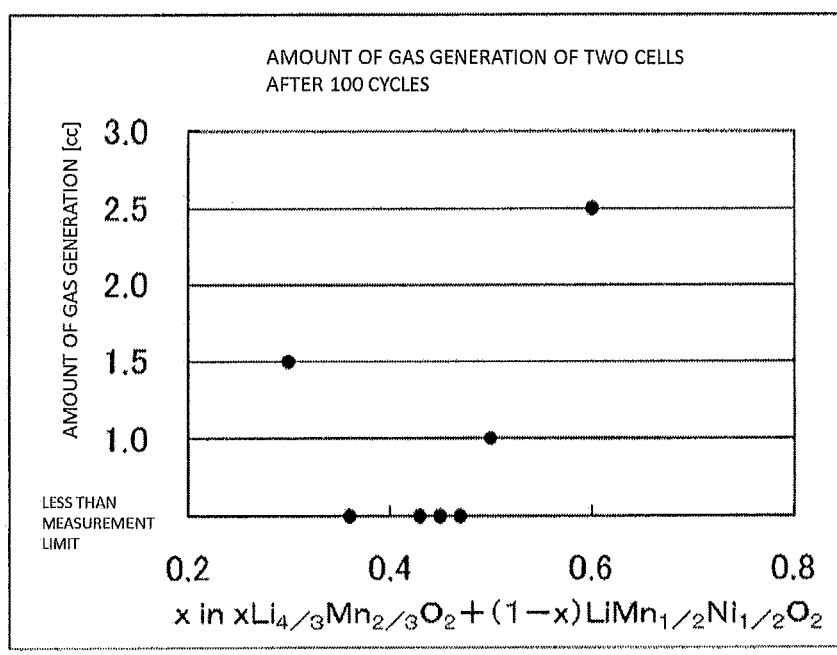
FIG. 2 is a graph illustrating composition dependency of an amount of gas generation based on measured values of Examples 1 to 5, and Comparative Examples 1 and 2.
Figure 3:
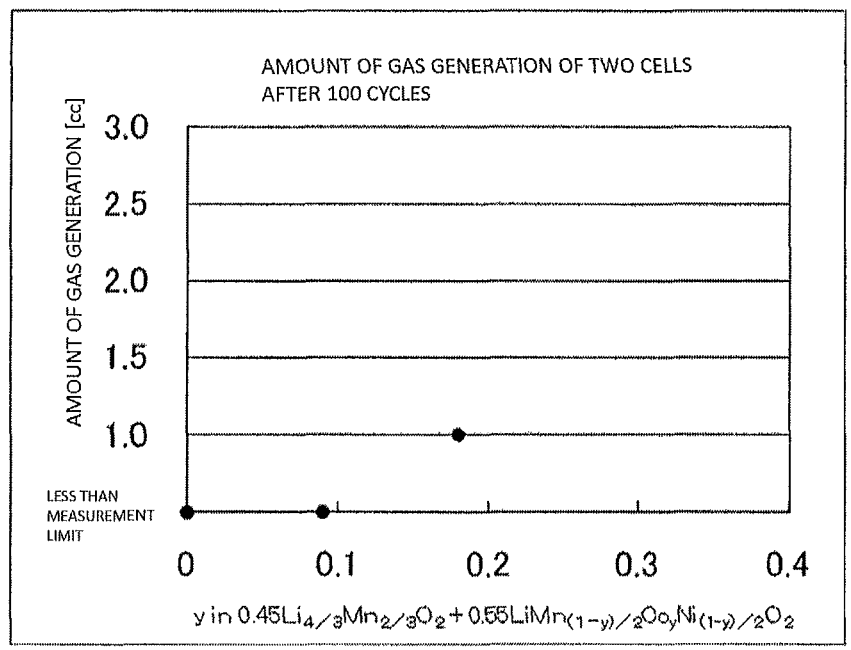
FIG. 3 is a graph illustrating the composition dependency of the amount of gas generation based on measured values of solid solution powders (samples) which are obtained in Examples 2, 6, and 7.

From the results of Table 1, FIG. 2, and FIG. 3, with regard to the lithium-manganese-type solid solution powders (samples) that were obtained in Examples 1 to 7, gas generation was sufficiently suppressed. Among these, with regard to the lithium-manganese-type solid solution powders (samples) that were obtained in Examples 1 to 4, and Example 6, gas generation was not recognized (less than a measurement limit).

From these results, in a positive electrode material containing a solid solution expressed by a composition formula: $xLi_{4/3}Mn_{2/3}O_2+(1-x)LiMn_{(1-\beta)/2}Co_\beta Ni_{(1-\beta)/2}O_2$ ($\beta=0$ to 0.2), it could be seen that when x is equal to or more than 0.36 and less than 0.50, the gas generation may be significantly suppressed.

When putting together the results and testing experience until now, in a positive electrode material containing solid solution expressed by a composition formula: $xLi_{4/3}Mn_{2/3}O_2+(1-x)LiMn_\alpha Co_\beta Ni_\gamma O_2$ (in the formula, $0.2 \leq \alpha \leq 0.6$, $0 \leq \beta \leq 0.4$, and $0.2 \leq \gamma \leq 0.6$), it may be considered that when x is equal to or more than 0.36 and less than 0.50, the gas generation is significantly suppressed similarly to the above-described conditions.

In addition, with regard to the examples and comparative examples, in $LiMn_{(1-\beta)/2}Co_\beta Ni_{(1-\beta)/2}O_2$, $\beta=0.0$ to 0.18 was shown. In other tests not described in the present specification, it was confirmed that when $\beta$ is up to the extent of 0.4, the gas generation is within a permissible range, and when $\beta$ is 0.2 or less, the gas generation may be further suppressed. From these results, when suppressing of the gas generation may be confirmed in a case of $\beta=0$, it is considered that the gas generation may be suppressed to the extent of $\beta=0.0$ to 0.4.

The invention claimed is:

1. A lithium-manganese-type solid solution positive electrode material including a monoclinic structure of C2/m in a hexagonal structure of a space group R-3m, wherein the lithium-manganese-type solid solution positive electrode material comprises a solid solution expressed by a composition formula:

$xLi4/3Mn_{2/3}O_2+(1-x)LiMn_{(1-\beta)/2}Co_\beta Ni_{(1-\beta)/2}O_2$ (in the formula, $\beta$ is 0);

and in the composition formula, x is equal to or more than 0.36 and less than 0.48.

2. The lithium-manganese-type solid solution positive electrode material according to claim 1, wherein in an XRD pattern, in addition to a peak that belongs to the hexagonal structure of the space group R-3m, a peak which does not belong to the hexagonal structure of the space group R-3m but belongs to the monoclinic structure of C2/m is present at $2\theta=19.5$ to $23.0°$.

3. The lithium-manganese-type solid solution positive electrode material according to claim 1, wherein a c-axis length of a crystal lattice in the hexagonal structure of the space group R-3m is 14.255 Å to 14.275 Å.

4. The lithium-manganese-type solid solution positive electrode material according to claim 1, wherein in an XRD pattern that is obtained by XRD measurement, a ratio of the sum area of peaks located within a range of $\theta=19.5°$ to $23.5°$ to the total area obtained by adding the sum area of peaks located within a range of $\theta=18.0°$ to $19.5°$ and the sum area of peaks located within a range of $\theta=43.0°$ to $46.0°$ is 0.145 to 0.185.

5. The lithium-manganese-type solid solution positive electrode material according to claim 1, wherein in the composition formula, as a substitution element of the metal elements other than Li, one or two kinds selected from a group consisting of Nb, V, Mg, Al, and Ti are contained, and the total content of the substitution element is 10% by mole or less of the number of moles of the metal elements other than Li.

6. The lithium-manganese-type solid solution positive electrode material according to claim 1, wherein the lithium-manganese-type solid solution positive electrode material further contains B (boron).

* * * * *

UNITED STATES PATENT AND TRADEMARK OFFICE
CERTIFICATE OF CORRECTION

PATENT NO.         : 9,466,829 B2                                      Page 1 of 1
APPLICATION NO.    : 13/966788
DATED              : October 11, 2016
INVENTOR(S)        : Akihiro Modeki et al.

It is certified that error appears in the above-identified patent and that said Letters Patent is hereby corrected as shown below:

Claims

Column 10, Line 24, Claim 1, delete "$_xLi4/3$" and insert -- $_xLi_{4/3}$ --

Signed and Sealed this
Thirteenth Day of December, 2016

Michelle K. Lee
*Director of the United States Patent and Trademark Office*